Jan. 2, 1934.                    J. H. HOWARD                    1,942,213
                                  PIPE SUPPORT
                              Filed Oct. 8, 1931                2 Sheets-Sheet 1

Jas. H. Howard  Inventor

Jesse R. Stone
Lester B. Clark
            Attorneys

Patented Jan. 2, 1934

1,942,213

UNITED STATES PATENT OFFICE 1,942,213

PIPE SUPPORT

James H. Howard, Houston, Tex., assignor to J. H. McEvoy & Company, Houston, Tex., a corporation Application October 8, 1931. Serial No. 567,537

5 Claims. (Cl. 285—22)

My invention relates to means for supporting one pipe within another so as to so make a seal between the two pipes.

My invention is adapted particularly for use in supporting pipe within a deep well, but is applicable for other uses.

It is an object of the invention to provide a simple and cheap construction whereby a pipe or tubing may be supported at the upper end of the well within the casing, said support being constructed to provide against lateral swinging movement of the tubing and to combine therewith a means for sealing the space above the supporting structure.

I desire to provide a support which may be used in place of the usual casing-head which will sustain the weight of the inner pipe or tubing and also allow for a stuffing box at the upper end thereof, all so combined that the packing in the stuffing box may be renewed when desired.

In the drawings herewith Fig. 1 is a side view partly in central vertical section showing a preferred embodiment of my invention.

Figure 1:
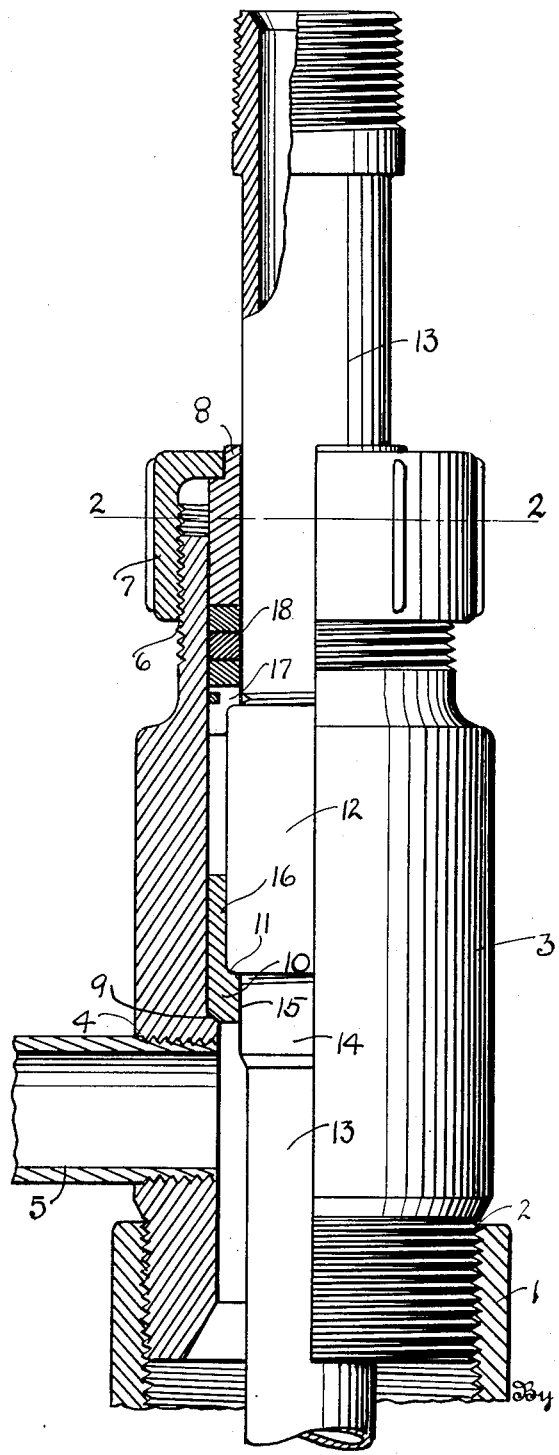
Figure 2:
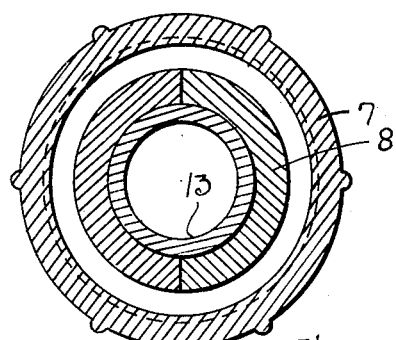
Fig. 2 is a transverse section taken on the plane 2—2 of Fig. 1.

In Fig. 1 I have simplified the usual construction of casing-head. The part shown at 1 in the drawing may be a coupling at the upper end of the casing internally threaded for engagement with the shank 2 of a special head or nipple 3. The head 3 is a tubular member which may have a lateral opening 4 threaded to receive a pipe 5. Any desired number of lateral openings may be provided. At the upper end the head is reduced in diameter and threaded at 6 to receive a cap 7 which is adapted to engage the gland 8 forming a portion of a stuffing box in the upper end of the head.

On the interior of the head the side wall is recessed toward the upper portion to provide a shoulder 9 upon which may rest a ring 10 provided on its inner face with a seat 11 to receive the coupling member 12 of the pipe or tubing 13. The ring 10 and coupling 12 may be made in one piece as will be later described.

The tubing 13 is shown as being of upset pipe whereby the ends thereof are thickened externally as shown at 14. The coupling projects outwardly beyond the outer surface of the upset portion. The supporting ring 10 in the head is formed to fit against the upset portion of the pipe at 15 and against the outer surface of the coupling at 16. Thus the ring 10 will not only support the weight of the same but will also support it laterally adjacent the threaded portion of the joint so as to prevent swaying or weaving of the pipe relative to the coupling and thus prevent danger of cracking at the threads.

Above the coupling 12 the tubing 13 is packed about with a stuffing box including a lower supporting ring 17 and packing rings 18 thereon which are adapted to be compressed by the gland 18 moved downwardly thereon by the cap 7. The gland 8 as well as the supporting rings 17 and the packing rings may be longitudinally divided so as to enable them to be fitted about the tubing and clamped in position.

In this construction it is possible to support a tubing or other pipe at the upper end of the well in such manner as to prevent cracking of the pipe at the threads adjacent the support due to fatigue in the metal during operation; and the seal maintained by the coupling in the supporting ring may be tight enough so that if occasion arises to renew the packing in the stuffing box this may be done without the danger of a blow out in the casing from the upper end of the well. The structure is materially simple and economical and it will be possible to supply the same at a price within the reach of the ordinary operator. The pipe is held against longitudinal movement in an upward direction by the gland, the lower ring 17 of which fits against the upper end of the coupling. The rigid support of the tubing relative to the head is a material feature of the invention.

Figure 4:
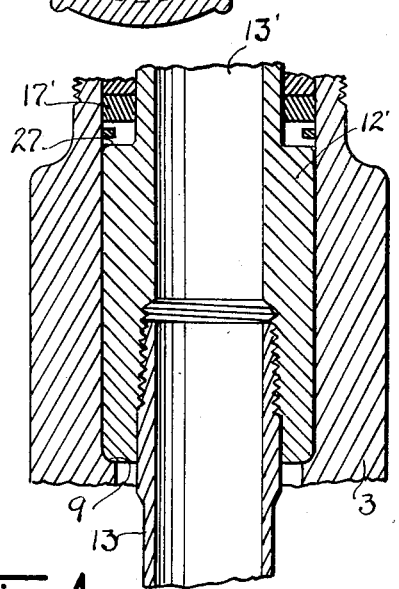
Fig. 4 is a longitudinal sectional view of a slightly different embodiment of the invention.

With the lower ring 10 removed from the head it is possible to run the tubing into the well thru the head. It is possible to make parts 13, 17, 12, and 16 into one piece, thereby simplifying the head further. This construction is shown in Fig. 4 wherein the coupling 12' has been made thick enough to fill the space within the head 3 and fit within the seat 9. At the upper end the coupling is made integral with the tubing section 13' and lower ring 17' of the stuffing box engages directly upon the shoulder 27 of the coupling.

Figure 3:
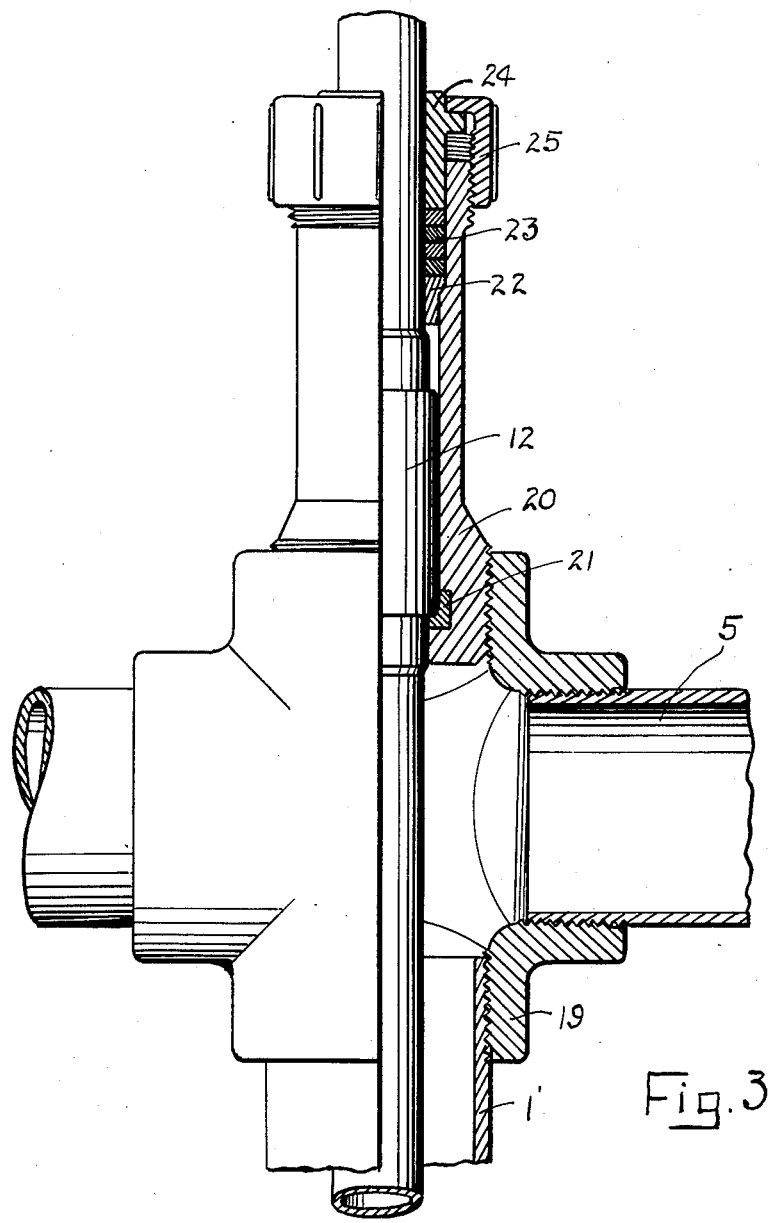
Fig. 3 is a side view similar to that shown in Fig. 1 illustrating a slightly different embodiment of the invention.

In Fig. 3 the device is somewhat modified. I have shown the casing 1' as connected at its upper end to a cross-shaped fitting 19 whereby two lateral outlets 5 are provided. The support for the tubing is provided within a special bushing or head 20 screwed within the upper end of the fitting. This bushing has a seat 21 at its lower end for the tubing coupling and a stuffing box sealing around the upper end of the tubing as in the other embodiment.

The seat 21 within the lower end of the bushing is provided by fitting within an annular groove on the inner face thereof a ring of metal which may be of soft metal if desired, such as bronze or lead, to make a better seal with the coupling 12 on the tubing when the weight of the tubing is supported thereon. The tubing and coupling are fitted closely about by the bushing to prevent lateral swinging movement as in the other embodiment of the invention.

The stuffing box at the upper end of the bushing includes a ring 22 fitting against a shoulder in the bushing and acting to support the packing rings 23. A gland member 4 is adapted to be clamped downwardly upon the packing by means of the cap or nut 25.

It is sometimes the case that an operator may have some old crosses that he wants to use; therefore, with the addition of the combined tubing hanger and stuffing box, a very cheap and economical tubing head is realized, simply by the addition of my bushing 20.

In this construction the operation will be essentially the same as in the other device and it will be seen that in both cases a cheap and economical construction is provided which may take the place of the usual casing-head and other equipment heretofore employed. I am enabled to support the tubing in the casing or other pipe so as to provide a seal around the same and a strong and sturdy support which will prevent strain upon the pipe tending to cause it to crack at the threads.

The dual sealing of the space between the tubing and the casing is of vital importance to life and protection of property; because, heretofore, it has been customary to have only one sealing means, a common stuffing box, which would burn out if the well should catch on fire, and allow the fluid or gas between the tubing and casing to ignite also making the fire harder to control. If the packing became old and ineffective, it was impossible, under pressure, to repack the stuffing box, which might have given away and caused a blow out. It is possible to repack this stuffing box without changing any of the connections in the flow line above the head.

What I claim as new is:

1. In a well head equipment, an outer pipe, a fitting connected at the upper end thereof, an inner concentric pipe, cylindrical couplings of uniform exterior diameter on said inner pipe, a supporting bushing threaded within the upper end of said fitting, a metal ring supported on the interior wall of said bushing upon which one of said couplings may seat, said bushing being formed to fit closely about said inner pipe and its couplings, said pipe extending above said bushing and a sealing means about said inner pipe at the upper end of said bushing, above said coupling.

2. A well head attachment for a well casing, including a tubing therein, a supporting bushing associated with said casing and adapted to fit closely about a coupling on said tubing, a sealing ring in said bushing to engage below said coupling and against the pipe below said coupling, and a stuffing box in said bushing about said tubing at the upper end of said bushing and spaced above the upper end of said coupling.

3. The combination of a well casing, a pipe therein, means at the upper end of said casing to fit closely about a cylindrical coupling on said pipe and support the same, said pipe extending above said coupling, said means also engaging said pipe below said coupling, a stuffing box above said coupling and a gland on said stuffing box engaging detachably above said coupling and against said pipe above said coupling.

4. In a well head equipment, a casing, a tubing therein, a tubing extension adapted to project above said casing, a head on said casing having an annular seat therein, a coupling member on said extension connecting with the tubing in said casing, said coupling being movable downwardly through said casing and fitting closely within said head and engaging upon said seat to support said tubing, and means to seal about said extension above said coupling at the upper end of said head.

5. In a well head equipment, a casing, a tubing therein, a coupling therein, a tubing extension adapted to project above said coupling, a head on said casing having an annular seat therein, said coupling fitting closely within said head and engaging upon said seat to support said tubing, said coupling having a downwardly extending end below the connection with the tubing to bear against said tubing and prevent excessive flexing of the tubing at the connection, and means to seal about said tubing above said coupling.

JAMES H. HOWARD.